C. F. MOORE.
BRAKE RIGGING.
APPLICATION FILED APR. 17, 1915.

1,147,036.

Patented July 20, 1915.
2 SHEETS—SHEET 1.

Clement F. Moore
INVENTOR.

BY
ATTORNEYS.

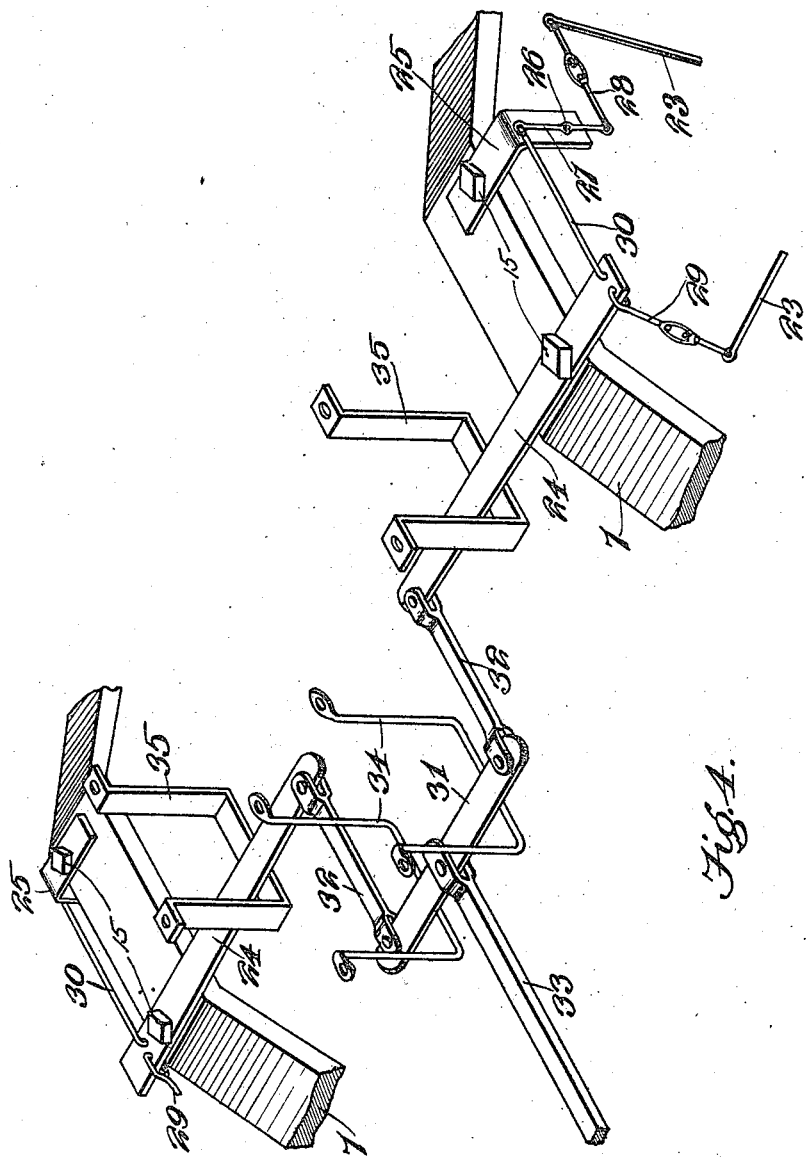

UNITED STATES PATENT OFFICE.

CLEMENT F. MOORE, OF CHICAGO, ILLINOIS.

BRAKE-RIGGING.

1,147,036.

Specification of Letters Patent. Patented July 20, 1915.

Application filed April 17, 1915. Serial No. 22,131.

*To all whom it may concern:*

Be it known that I, CLEMENT F. MOORE, a citizen of the United States, residing at Chicago, in the county of Cook and State of Illinois, have invented certain new and useful Improvements in Brake-Rigging, of which the following is a specification.

This invention relates to railway brakes, and its object is to provide a simple and cheap brake rigging so arranged and located that there is no danger of the parts, if they should be broken, falling on the track rails.

The herein stated object is attained by means of a novel combination and arrangement of parts to be hereinafter described and claimed, reference being had to the accompanying drawings in which—

Figure 1:
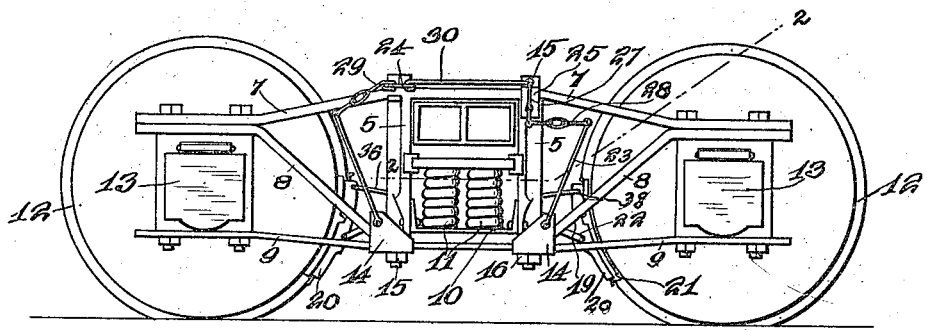
Figure 2:
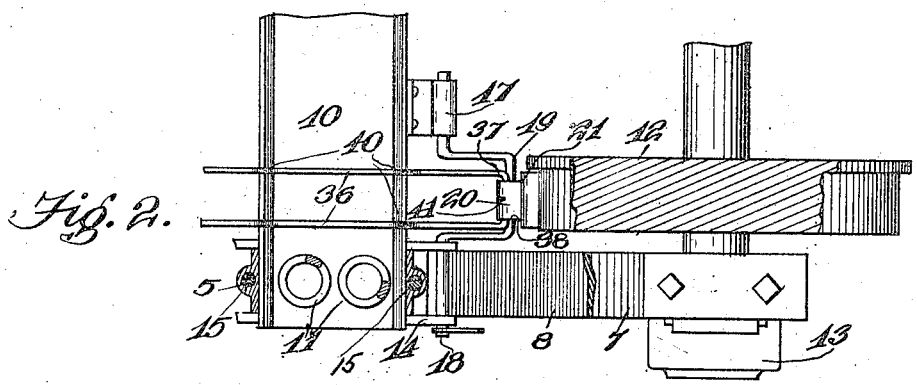
Figure 3:
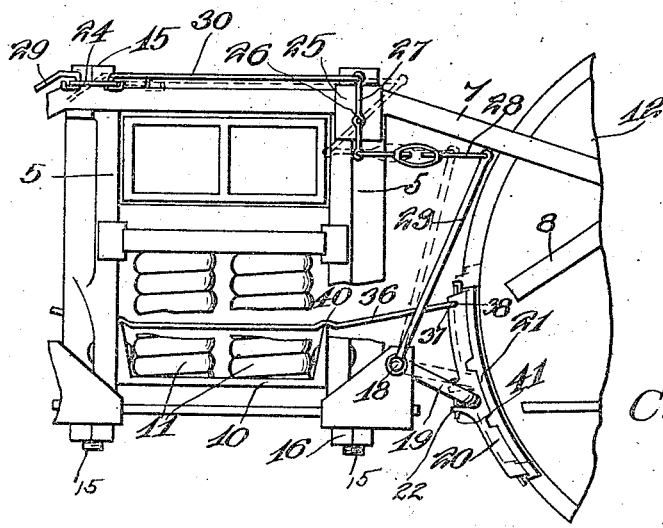

Figure 1 is an elevation of a car truck showing the application of the invention; Fig. 2 is a horizontal section on the line 2—2 of Fig. 1; Fig. 3 is an enlarged elevation of one of the brakes, and Fig. 4 is a perspective detail.

Referring specifically to the drawings, the invention is shown applied to an ordinary car truck having columns 5, an arch bar 7, an inverted arch bar 8, and a pedestal tie bar 9. The spring plank 10 supports the bolster springs 11 in the usual manner. The wheels are shown at 12 and the journal boxes at 13. These parts are all arranged in the ordinary manner and as they form no part of the present invention, a further description is deemed unnecessary.

Mounted on the truck, at the bottom of the columns 5, are brackets 14 suitably shaped to clear the inverted arch bar 8 and the pedestal tie bar 9, said brackets being apertured to receive the lower ends of the column bolts 15, and being secured by nuts 16 screwed on said bolts. In line with the brackets 14, the front and rear edges of the spring planks 10 carry brackets 17. The brackets 14 and 17 have bearings which support rock shafts 18 extending transversely of the truck and having crank bends 19 intermediate their ends. These rock shafts carry brake heads 20 provided with the usual detachable brake shoes 21, the brake heads having rear slots 22 through which the crank portions of the rock shafts pass. The brake heads and their supports are so positioned on the truck that the brake shoes are opposite the tread of the respective wheels 12, a brake being provided for each wheel.

On one end of each rock shaft 18 is made fast an arm 23, which, when it is swung, rocks the shaft to apply or release the brakes. Pivotally mounted on top of the arch bar 7, by the upper end of one of the colmun bolts 15, under the head of the latter, is a lever 24, said lever swinging horizontally. The other column bolt secures a bracket 25 to which is pivoted, intermediate its ends, at 26, a vertically swinging lever 27. The lower end of the lever 27 is connected by a rod 28 to the upper end of one of the arms 23, the other one of said arms being connected by a rod 29 directly to the lever 24. The upper end of the lever 27 is connected by a rod 30 to the same end of the lever 24 to which the rod 29 is connected.

By the arrangement of levers and rods hereinbefore described, the rock shafts 18, through their arms 23, are simultaneously operated to actuate the brakes when the lever 24 is swung. The rods 28 and 29 will be provided with turnbuckles, as shown in Fig. 4, so that they may be lengthened or shortened.

The brake mechanism hereinbefore described is the same on both sides of the truck, and the levers 24 of the two sets of brakes are connected at their inner ends to an equalizer bar 31 by links 32. The equalizer bar has a suitable connection 33 with the piston of the brake cylinder, or the cylinder rod. The equalizer bar is supported on hangers 34 mounted on the car frame, and similar hangers 35 are provided for the lever 24. If any of the parts break, they are held up by the hangers and thus prevented from falling on the roadbed or the rails. The break heads 20 are also provided with auxiliary supports comprising spaced rods 36 connected at their ends by loops 37 which pass through apertures 38 in the upper ends of the brake heads, the connection being a loose one so as not to interfere with the swing of the brake heads. The rods 37 seat on top of the spring plank 10 and have bends 40 to fit over the edges of the flanges thereof. These auxiliary supports serve to steady the brake heads on their short upward and outward movement to apply the brake shoes. The brake heads are prevented from dropping off the cranks 19 by pins 41 passing through the brake heads back of the cranks.

The brake rigging hereinbefore described has been devised to obviate the danger of wrecks or derailments from the parts dropping on the rails of the track. The usual brake beam extending transversely of the track has been eliminated, and the parts have been so positioned that in the event of breakage they will not drop on the rails, the parts not supported by the hangers 34 and 35 being on the outside of the rails and readily accessible for repairs without going under the car or between the rails.

I claim:—

1. The combination with a railway car truck; of brackets carried by the truck, rock shafts supported by the brackets and having cranks, brake heads carried by the cranks, arms fixed on the rock shafts, a horizontally swinging lever carried by the truck, operative connections between the lever and the respective arms of the rock shafts, and actuating means for the lever.

2. The combination with a railway car truck; of brackets carried by the truck, rock shafts supported by the brackets and having cranks, brake heads carried by the cranks, arms fixed on the rock shafts, a horizontally swinging lever carried by the truck, an operative connection between the lever and the arm of one of the rock shafts, a vertically swinging lever carried by the truck, a connection between the arm of the other rock shaft and one end of the last-mentioned lever, a connection between the other end of said lever and the first-mentioned lever, and actuating means for the first-mentioned lever.

3. The combination with a railway car truck; of brackets carried by the truck, rock shafts supported by the brackets and having cranks, brake heads carried by the cranks, arms fixed on the rock shafts, a horizontally swinging lever carried by the truck, operative connections between the lever and the respective arms of the rock shafts, actuating means for the lever, and auxiliary supports carried by the truck and loosely connected to the brake heads.

4. The combination with a railway car truck; of brackets carried by the truck, rock shafts supported by the brackets and having cranks, brake heads carried by the cranks, arms fixed on the rock shafts, a horizontally swinging lever carried by the truck, operative connections between the lever and the respective arms of the rock shafts, actuating means for the lever, and hangers on the car frame supporting the lever and its actuating means.

5. The combination with a railway car truck; of brackets carried by the spring plank, brackets mounted on the bottom of the columns by the column bolts, rock shafts supported by the brackets and having cranks, brake heads carried by the cranks, arms fixed on the rock shafts, a horizontally swinging lever carried by the truck, operative connections between the lever and the respective arms of the rock shafts and actuating means for the lever.

6. The combination with a railway car truck; of brackets carried by the truck, rock shafts supported by the brackets and having cranks, brake heads carried by the cranks, arms fixed on the rock shafts, a horizontally swinging lever carried by the truck, operative connections between the lever and the respective arms of the rock shafts, actuating means for the lever, and auxiliary supports carried by the spring plank and loosely connected to the brake heads.

In testimony whereof I affix my signature in presence of two witnesses.

CLEMENT F. MOORE.

Witnesses:
S. J. LEHRER,
H. G. BATCHELOR.